William G. Leamon, Inventor

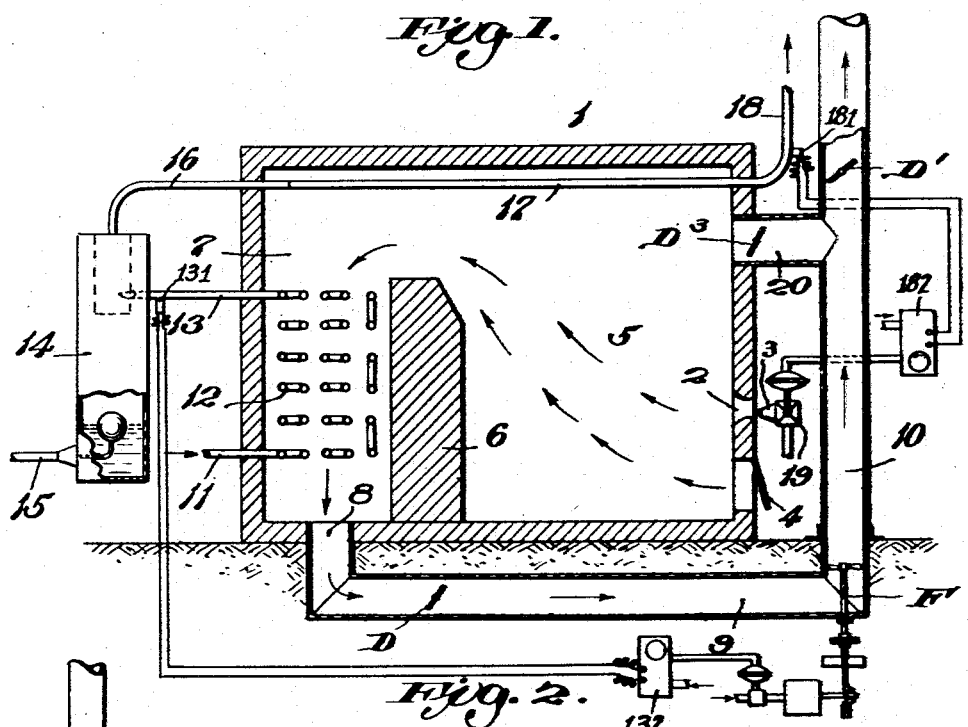
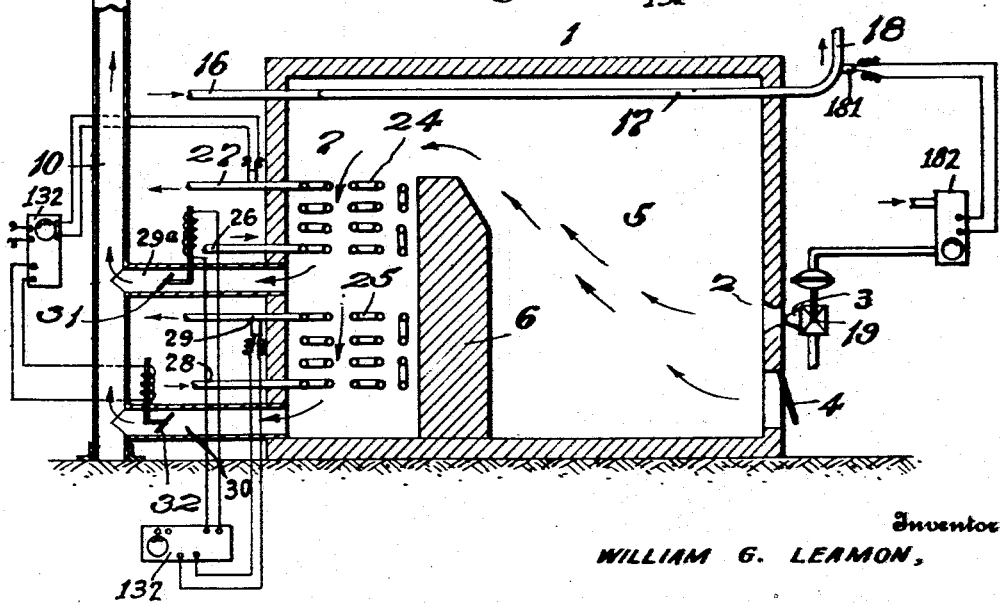

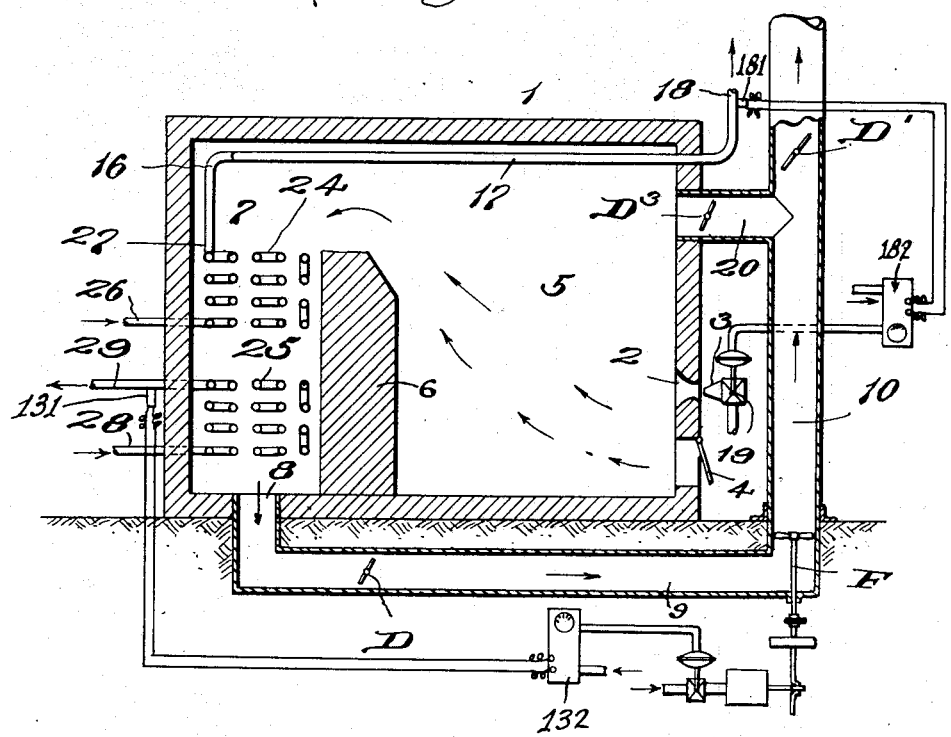

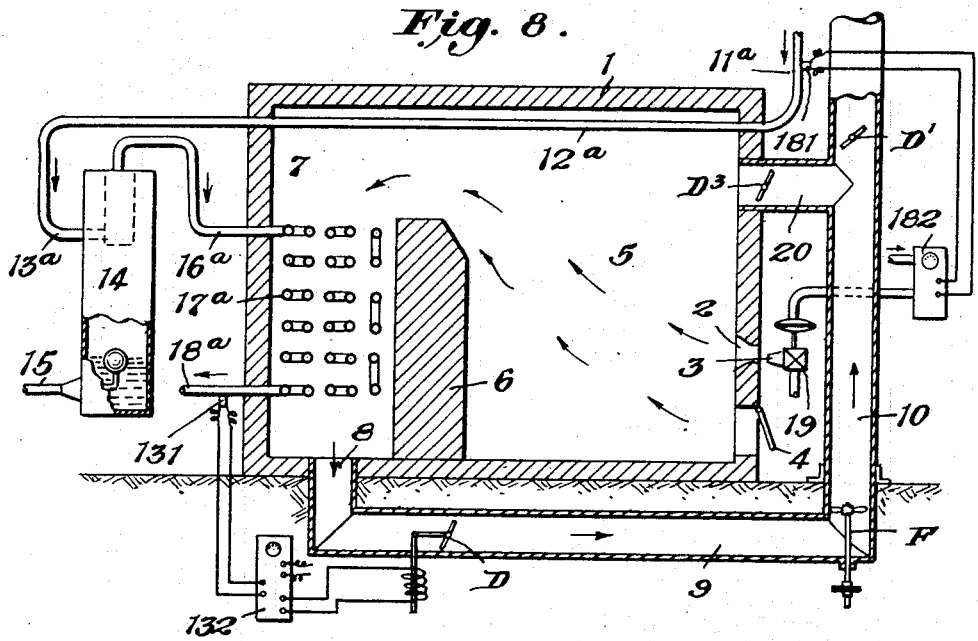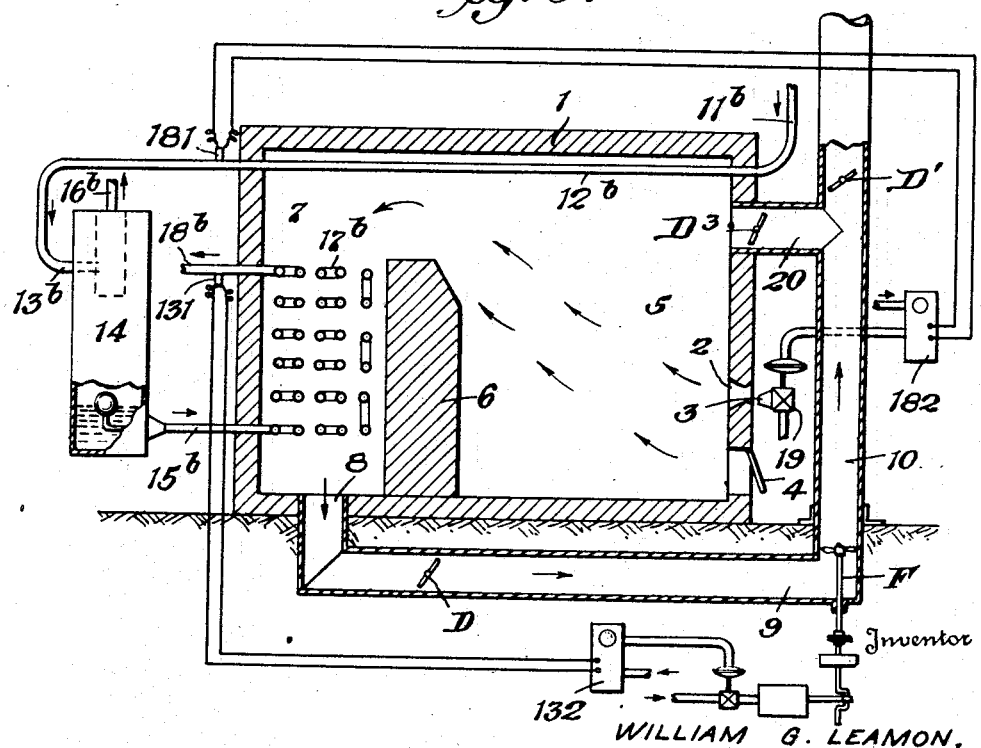

Patented Oct. 31, 1933

1,933,020

UNITED STATES PATENT OFFICE 1,933,020

HEATING APPARATUS AND PROCESS OF CONTROLLING TEMPERATURES THEREIN

William G. Leamon, New York, N. Y.

Application September 17, 1928
Serial No. 306,556

27 Claims. (Cl. 196—116)

This invention relates to heating apparatus and processes of controlling temperatures therein; and it relates more particularly to fluid heaters and processes of controlling fluid heater temperatures.

Although the invention is useful in connection with the heating of fluids and other materials in general, it is especially useful in connection with the treatment, including simple distillation or destructive distillation or cracking of mineral oils, and for convenience in illustrating and describing one practical embodiment of the invention it will be described in this connection, although it is to be understood that it is not to be limited to this particular use.

In the treatment of oil, for example, it is frequently desirable to heat the oil to different temperatures at different stages of the treatment and it is desirable to vary or control these temperatures depending upon the character of the oil being treated, upon the product desired, and upon other operating conditions. For instance, in the distillation or cracking of oil, it may be desirable to first vaporize the oil by passing it through vaporizing elements of a heater of the pipe-still type, the vaporizer outlet temperature being maintained at such value that the desired quantity will be vaporized and then to superheat the vapors, the outlet temperature of the superheater being maintained at a temperature suitable for efficient processing. This heating to different temperatures can be effected and controlled by the use of two or more heaters or by the use of a heater having two or more fireboxes or similar sources of heat, but such constructions are expensive to install and to operate, besides being open to other objections.

The principal object of the present invention is to provide a process for carrying on two different or independently controlled heating operations in a single heater having but one firebox or similar source of heat.

Another object of the invention is to provide apparatus wherein the process of the present invention may be carried out to advantage.

Other and more specific objects of the invention, together with further advantages attained thereby, will appear more fully hereinafter.

In its most advantageous practical embodiment, the invention of the present application is characterized by an arrangement of the heating elements relative to a common source of heat whereby one of the elements is heated mainly by radiation and the other is heated mainly by convection, the exit temperature of the material being heated in each of the elements being independently controlled by regulating the intensity of the heat and the quantity of the heat-conducting medium supplied, respectively.

The material to be heated may pass through the separate heating elements in series or in parallel or the material may come from separate sources and pass through each heating element independently of the other.

Either or both of the heating elements or sets of heating elements can be divided or split-up to provide what is really a plurality of heating elements of each type and these elements or sets of elements can be connected as desired in separate circuits or sets of elements through which material to be heated may pass. For instance, one circuit may comprise a convection heated element and a radiant heated element and another circuit may comprise a convection heated element; or each circuit may comprise one or more elements of each type so that initial or intermediate heating of the material in each circuit may take place in an element of different type from that in which it receives its final controlled heating. When elements of different type are connected in a circuit as explained above, the control of the final or exit temperature of the material being heated in each circuit is achieved by passing said material through a separately controlled final heating element in each circuit.

Further explanation of the invention can best be given by reference to the accompanying drawings whereby apparatus that has been found desirable in practice for carrying out the process of the invention is illustrated more or less schematically or diagrammatically.

In the drawings:

Fig. 1 is a side elevation in section of one form of apparatus within the scope of the invention.

Figs. 2, 3, 4, 5, 6, 7, 8 and 9 are views similar to Fig. 1, each showing modified forms of apparatus embodying the invention.

Figure 3:
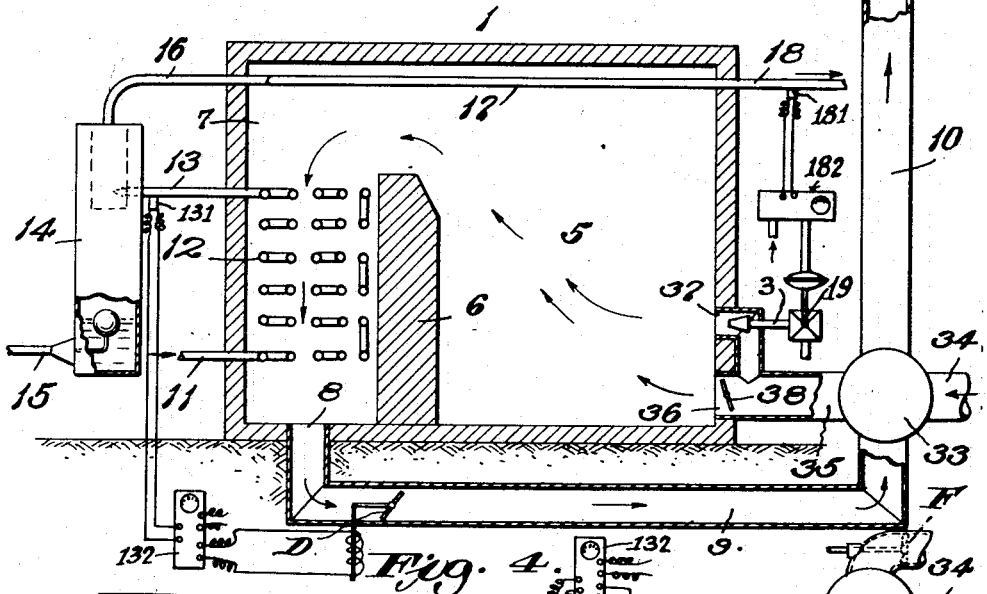

Referring to the drawings in Fig. 1, 1 indicates generally the encasing walls of a heater of the pipe-still type. 2 is the burner hole or point at which the heater furnace is fired by means of a suitable burner or other source of heat 3, and 4 is an air inlet door or valve for regulating the supply of air to the furnace. The heated gases or products of combustion from the firebox or combustion chamber 5 pass over the bridge wall or baffle 6 and enter a heating region or chamber 7 from which the hot gases leave through opening 8, being conducted by conduit 9 to stack 10 which exhausts the gases to atmosphere or otherwise disposes of them, as explained hereinafter. F is a fan, actuated by any suitable means not shown, for creating a draft, either independently of or in addition to natural draft in stack 10 and duct 9, and D and D' are dampers or valves for controlling the flow of gases in these conduits.

In one practical embodiment of the invention shown in Fig. 1, 11 indicates a pipe through which the material to be heated, in this case oil, enters the tube bank or coil 12 mounted in the heating chamber 7. Coil 12 is heated by the hot flue gases passing in contact therewith and as a result the oil passing through coil 12 is heated to vaporizing temperature, the mixture of liquid oil—oil vapors formed leaving vaporizer coil 12 through pipe 13 and in the specific example illustrated, this pipe discharges into the liquid oil—oil separator 14. This separator, which may be of any suitable type, is in the present instance a mechanical separator of the upright cylindrical drum type. The separated oil which collects in the separator 14 is drained out by the outlet pipe 15 controlled by a suitable liquid level regulating valve. The separated vapors from the separator 14 pass through pipe 16 to a heating element or coil 17 mounted within the heater 1 near the top or roof, said coil or tube bank 17 constituting, in the present instance, a superheater coil which extends into the upper portion of the firebox or combustion chamber 5 and heating chamber 7. The vapors from the secondary or superheating coil 17 leave the heater through pipe 18 at a desired maximum outlet or exiting temperature, and are subjected to such further treatment as is necessary or desirable. If desired, the course of the oil may be just the reverse of that descrbed, the oil to be heated entering pipe 18 and after passage through coils 17 and 12 leaving at 11, coil 17 in this case being the vaporizing or initial heating coil and coil 12 being the secondary heating or superheating coil. Liquid, instead of vapor, separated out in separator 14 may be returned for further heating or the separator may be eliminated and the oil may pass through the coils in parallel or oil from the same or different sources may be heated independently in each coil and be independently discharged.

As already stated, it is frequently desirable to carry on two different and separately controlled heating operations or, in some cases, to separately control the temperature of the material being heated at two or more points and the arrangement of heating coils just explained provides means for effecting such control with the use of only one heater, which is, of course, very desirable from the standpoints of simplicity and economy. It is to be noted that the heating element or coil 17, which may be protected by tile or fire brick if desired, is exposed to the flame or heat produced by combustion in the firebox 5 and to the hot firebox walls; hence most of the heat it receives is through radiation. As the rate of radiant heat reception is proportional to the fourth power of the difference between the absolute temperatures of the radiating body (in this case the firebox walls and flame) and the heat absorbing or cold body, it is evident that a slight change in the firebox temperature will cause a large change in the amount of heat transferred to the heating or superheating element and, consequently, a large change in the outlet temperature of the vapor flowing through the superheater coil when the rate of vapor flow remains constant. In contrast to this, the heat transferred to the vaporizing element or coil 12 does not vary greatly with change in firebox temperature because, being shielded from the firebox 5 by the bridge wall 6, comparatively little radiant heat reaches vaporizing element 12, practically all the heat received by the vaporizing element being transferred by convection from the hot gases passing from the combustion chamber over the bridge wall into contact with said vaporizing coils. The rate of convective heat reception is proportional to the first power of the difference between the absolute temperatures of the body to be heated (the oil) and the heated body (the hot flue gases). The heat transferred also increases with increase in gas velocity. From the foregoing it follows that by controlling the intensity of the fire in the firebox 5, the temperature at the outlet of the superheating elements can be controlled; and by controlling the quantity of flue gas passed over the vaporizing elements, the temperature at the vaporizing element outlet can be controlled.

Where the surfaces are long or extensive the mean difference in temperature between the inside and the outside of the elements must be considered because, as the hot gas travels over the cold elements, the gas loses temperature and the oil in the elements gains temperature, which results in a continually changing difference in temperatures. For example if 500° F. is the temperature of the oil entering the vaporizing elements, 700° F. is the temperature of the oil leaving the vaporizing elements, 800° F. is the temperature of the flue gas after having passed over the vaporizing elements and 1600° F. is the temperature of the flue gas at it begins its passage over the vaporizing elements, for the purposes of this discussion, the mean flue gas temperature is $$\frac{1600° + 800°}{2} \text{ or } 1200° F;$$

the mean oil temperature is $$\frac{700° + 500°}{2} \text{ or } 600° F.;$$

and the mean difference in temperature is 1200°−600°, or 600° F.

Now if a greater quantity of hot gas passes over the vaporizing elements with the gas inlet temperature still 1600° F., the exit temperature will increase to say 1200° F. This will result in a greater mean temperature of the hot gas. Numerically it becomes $$\frac{1600° + 1200°}{2} \text{ or } 1400° F.$$

The mean temperature of the oil was 600° F. and the new mean difference will momentarily become 1400°−600° or 800° F. It is evident that more heat will be transferred to the vaporizing elements and the outlet temperature will continue to rise until equilibrium is reached at some point.

From this it is evident that, with a constant hot gas entering temperature, an increase in quantity of gas passed over the vaporizing elements causes an increase in heat transferred to the oil being vaporized and a decrease in quantity of hot gas causes a decrease in amount of heat transferred to the oil being vaporized.

In addition to the increase in heat transferred, resulting from an increase in mean temperature difference associated with an increase in quantity of hot gas passed over the vaporizing elements, there is also a gain due to the increase in rate of heat transfer which occurs with an increase in velocity of hot gas flowing over the vaporizing elements.

Now consider an operating condition in which the superheating element outlet temperature is 1050° F., the superheating element inlet temperature is 700° F., a vaporizing element outlet temperature is 700° F., the vaporizing element inlet temperature is 500° F., and the firebox temperature is 1600° F. If it becomes necessary or desirable to raise the vaporizing element outlet temperature, more air is admitted through the air inlet door or valve 4. The firebox 5 immediately begins to cool but at the same time the valve 19 controlling the supply of fuel to the burner is operated to cause more fuel to be burned in the firebox and the vaporizing element outlet temperature is raised to the desired temperature. Valve 19 may be manually or automatically operated, but it is preferable to have its operation automatically controlled as, for instance, by the temperature of the oil vapors leaving the heater. Thus a greater quantity of gas has been heated to the previous temperature and more passed over the vaporizing elements causing more heat to be transferred through the walls of said vaporizing element to the oil being vaporized.

One form of automatic control for valve 19 is diagrammatically shown in Fig. 1 in which a thermocouple 181, mounted in pipe 18, is connected to a gyrometer controller 182, which controls the operation of the valve 19 of burner 3, the pyrometer controller operating valve 19 to feed more or less fuel to burner 3 and thus automatically maintain any desired exit temperature of the material being heated in element 17. A somewhat similar form of control can be used for automatically controlling the operation of valves 4, D, D', D³ and fan F, or any of them, to thus control the exit temperature of the material being heated in element 12 (or 25). As diagrammatically shown, a thermocouple 131, mounted in pipe 13 (or 29), is connected to a pyrometer controller 132, which, in the form illustrated in Figs. 1 and 7, controls the speed of fan F, and in the form illustrated in Figs. 3 and 6 controls the position of damper D, and in the form illustrated in Figs. 4 and 5, controls the position of damper D³, the control in each case controlling the quantity of gas contacting with element 12 or 25. The Leeds and Northrup, and the Foxboro temperature controllers are typical of controllers which have proved satisfactory in practice.

If it becomes necessary or advisable to raise the exit temperature of the material from the radiant heated element without varying the exit temperature of the material from the convection heated elements, valve 19 of burner 3 is operated, either manually or automatically, to cause more fuel to be burned and thus to raise the temperature of the firebox until the desired exit temperature in the radiant heated element is reached and maintained. This increase in the temperature of the firebox raises the temperature of the gases contacting with the convection heated element and tends to raise the exit temperature of the material from said element. This tendency, however, is immediately compensated for, either manually or automatically, by reducing the quantity of gases passing over the convection heated element, valves 4, D, D', D³ and fan F, or any of them, being adjusted to effect such reduction. In practice, pyrometers are provided at the outlets of the heating elements to determine the exit or outlet temperatures and they automatically control the operation of the controls. As has been previously pointed out, a very slight increase in the temperature of the firebox effects a very large increase in the heat transferred to the radiant heated element due to the fourth power heat transfer relationship whereas only a very small decrease in the quantity of convection gases is required to compensate for the increased temperature due to the first power heat transfer relationship existing in the convection heated zone and thus the heating effects in the two elements can be separately and independently controlled with ease.

It will be observed that the invention provides a means for controlling the heat transferred in one set of elements without materially affecting the heat transferred in the other set in an oil heater having two separate sets of heating elements through which the oil may pass in series or in parallel or through which oil from separate sources may pass through each set of elements, independently of the other.

The desired control may also be effected by returning or recirculating flue gas, at a relatively high temperature to the firebox. Recirculation alone, instead of drawing in excess air, or recirculation in conjunction with excess air, may be used to effect the desired control. Recirculation has the advantage of saving fuel. Suppose that to effect the desired increase in heat transferred to the vaporizing elements, an additional 2000 pounds of gas per hour must be passed over them. If the firebox temperature is 1600° F. and the atmospheric air temperature is 100° F., it becomes necessary to raise 2000 pounds of air 1500° F., but if flue gas at 800° F. is introduced instead, it becomes necessary to raise 2000 pounds of gas approximately only 800° F. This obviously represents a substantial saving in fuel. A substantial saving in fuel can also be effected when preheated air is used.

For effecting the recirculation of the flue gas, a conduit or duct 20 is provided which connects the upper part of the firebox 5 with the stack 10, conduit 20 being in effect a branch of the stack. A damper or valve D³ is mounted in conduit 20 and by suitably adjusting this damper and dampers D and D' the desired amount of recirculation may be effected. If desired a fan or propeller 21 mounted on shaft 22 driven by motor 23 (see Figs. 4 and 5) may be provided, fan 21 being operated either alone or with the above mentioned dampers to effect recirculation of flue gases when this is desired.

In designing a heater for use with excess air or with recirculated flue gas as the means of obtaining the desired control, it is necessary to proportion the heating capacity of the vaporizing elements so that when just enough air is supplied for satisfactory combustion that the heat transferred to the vaporizing elements will not exceed that required. That is, the heating capacity of the vaporizing elements must be small enough to permit the desired minimum outlet temperatures to be maintained and the excess air or recirculated flue gas be depended upon to make up any deficiency in capacity under other conditions. Of course, all the flue gas need not pass over the convection heated or vaporizing elements and thus an additional control of the heating effect may thus be provided.

As previously mentioned, either or both of the heating elements or sets of heating elements can be divided to provide what is really a plurality of heating elements of each type and these elements or sets of elements can be connected as desired in separate sets of elements or circuits through which material to be heated may pass. In Fig. 7 one such arrangement is illustrated. The general arrangement in Fig. 7 is similar to that of Fig. 1, the main difference residing in the way the heating elements are arranged or connected. Like parts in the two figures are designated by like reference characters. In Fig. 7 three heating elements are shown, designated generally by 24, 25 and 17 respectively. Coils or elements 24 and 25, having inlets 26, 28 and outlets 27, 29, respectively, are located in heating chamber 7 and are therefore heated mainly by convection while element or coil 17 having inlet 16 and outlet 18 is heated mainly by radiation as previously described in connection with Fig. 1. The inlet 16 of element 17 is connected to outlet 27 of element 24, preferably inside the furnace or heater, as shown, and thus elements 24 and 17 provide a connected set of elements or circuit through which material to be heated is passed. The other circuit is composed of the element or set of elements 25. In the first mentioned circuit, the material to be heated would enter at 26 and leave at 18, being initially heated in the convection heated element 24 and finally heated in the radiant heated element 17 and in the second circuit the material would enter at 28 and leave at 29, the material being heated in the convection heated element 25. Instead of the arrangement of circuits illustrated, one circuit could comprise a convection heated element for initially heating the material to be heated and a radiant heated element for final heating of said material and the other circuit could comprise a convection heated element for initial heating of the material to be heated in this circuit, a radiant heated element for intermediate heating, and a convection heated element for final heating, the control of the final or exit temperature of the material heated in each circuit being achieved in the final element in the circuit, in the first example just mentioned this being done by regulating the intensity of the heat, i. e. temperature of the firebox, and in the second example this being done by regulating the quantity of flue gases contacting with the final heating element in this circuit. Obviously many other other combinations of elements can be made in addition to those given by way of example and thus a single heater can be adapted to widely varying conditions of operation.

In Fig. 2 is shown another modification with three heating elements with means for controlling the heat transferred to such elements.

The general arrangement is similar to that shown in Figs. 1 and 7, the flue gas recirculating feature being eliminated for the sake of simplicity, the chief difference being in the arrangement of the heating elements and the course of the hot gases through the heater. Like parts in Figs. 1, 2 and 7 are designated by like reference characters. In Fig. 2 the heating coil mounted in heating chamber 7 is made in two sections, or in reality, as two separate coils 24 and 25. Coil 24, which constitutes an intermediate temperature heating element has an inlet 26 and an outlet 27 and coil 25, constituting a low temperature heating element, has an inlet 28 and an outlet 29. Coil 17 having an inlet 16 and outlet 18 is similar to the parts correspondingly numbered in Fig. 1. Coil 17 constitutes a superheater or high temperature heating element. The hot gases from firebox 5 pass over bridge wall 6 and first engage and pass over intermediate temperature heating coil 24 and then low temperature heating coil 25, all of the hot gases being exhausted to atmosphere through stack 10 which is connected to the heating chamber 7 by ducts or conduits 29a and 30, controlled by valves or dampers 31 and 32 respectively, or a portion of the gases may be recirculated, if desired, as in Fig. 1, for example. Flue gas outlet or duct 29a is located intermediate the coils 24 and 25 and outlet 30 is located near the bottom of the chamber 7. By closing valve or damper 31 and leaving valve 32 open, all the flue gases will pass over both coils and by closing 32 and opening valve 31, the gases will only pass over coil 24. Any adjustment between these extremes can be made to vary the quantity of flue gases passed over the heating elements with a consequent variance in the heat transferred to those elements. With this arrangement of heating elements a single heater can be adapted to widely varying loads. One practical use of an arrangement of heating elements as shown in Fig. 2 is in passing a fluid in series through two or more processing regions, the exit temperatures of the heated fluid from the different heating elements being controlled and varied at will. With such a system requiring progressively increasing temperatures, the fluid would enter the low temperature element 25 at 28 and leave at 29 en route to the low temperature processing region, returning to the intermediate heating element 24 at 26 and leaving at 27 en route to the intermediate temperature processing region. From this region, the fluid would enter the high temperature heating element 17 at 16 and leave at 18 en route to the high temperature processing region. As has been previously pointed out, however, this arrangement of heating coils has many uses and the material to be heated may pass through the different heating coils in series or in parallel or material from different sources may pass through each element independently of each other.

Figure 4:
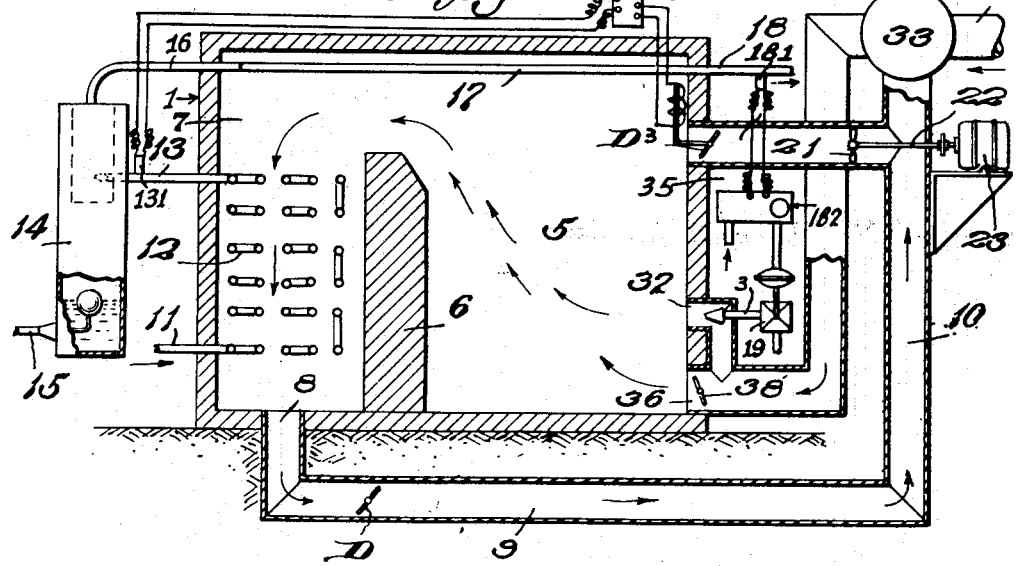
Figure 5:
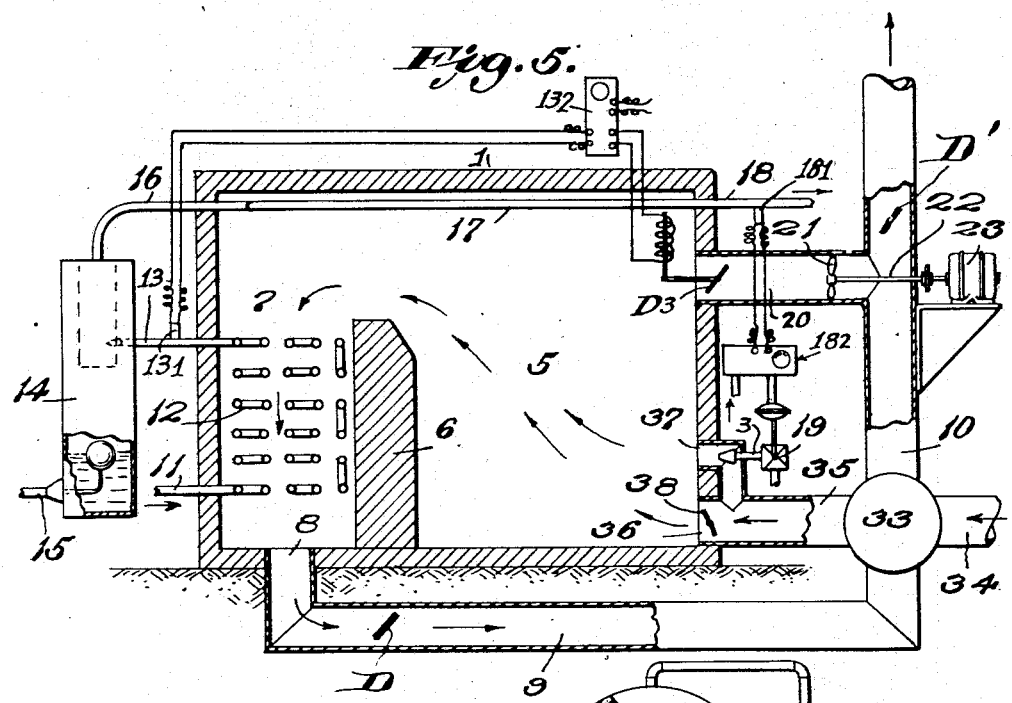

In Figs. 3, 4 and 5 are shown arrangements for preheating the air supplied to the heater. Figs. 3, 4 and 5 are similar in other ways to the construction shown in Fig. 1, with the exception that in Fig. 3 the flue gas recirculation feature is omitted. Like parts in the several figures are designated by like reference characters. Referring to Fig. 3, a preheater or heat-interchanger 33 is arranged in the stack 10 so that all the flue gas from the heater 1 will pass through the preheater. Air enters the preheater through pipe 34 and after being heated is conducted by pipe 35 to the air inlet 36 and burner hole 37 of the heater, pipe 35 being controlled by damper 38. By regulating damper 38 the amount of excess heated air admitted to the heater may be controlled and thus the control of oil outlet temperatures is effected.

In Figs. 4 and 5, the preheater 33 is shown in conjunction with the flue gas recirculation feature shown in Fig. 1. In Fig. 4 the preheater 33 is so arranged relative to the recirculation duct 20 that when recirculation takes place, the flue gases will divide before they reach the preheater, part of them passing through duct 20 and entering the heater for recirculation, the remaining part flowing to the preheater to heat the combustion air which enters through pipe 34, flowing from the preheater through pipe 35 to enter the heater at 36 and 37.

In Fig. 5 the preheater 33 is arranged in stack 10 so that all the flue gases flow through the preheater, part of the partially cooled flue gases from the preheater entering the duct 20 to be recirculated and the remaining part continuing to flow through stack 10 to atmosphere.

In Fig. 3, the control of oil outlet temperature is accomplished by regulating the amount of heated air admitted to the heater and in Figs. 4 and 5, oil outlet temperatures are controlled by regulating the amount of heated air admitted and by regulating the amount of flue gases recirculated. Preheating of the excess air admitted results in maximum economy of operation.

Figure 6:
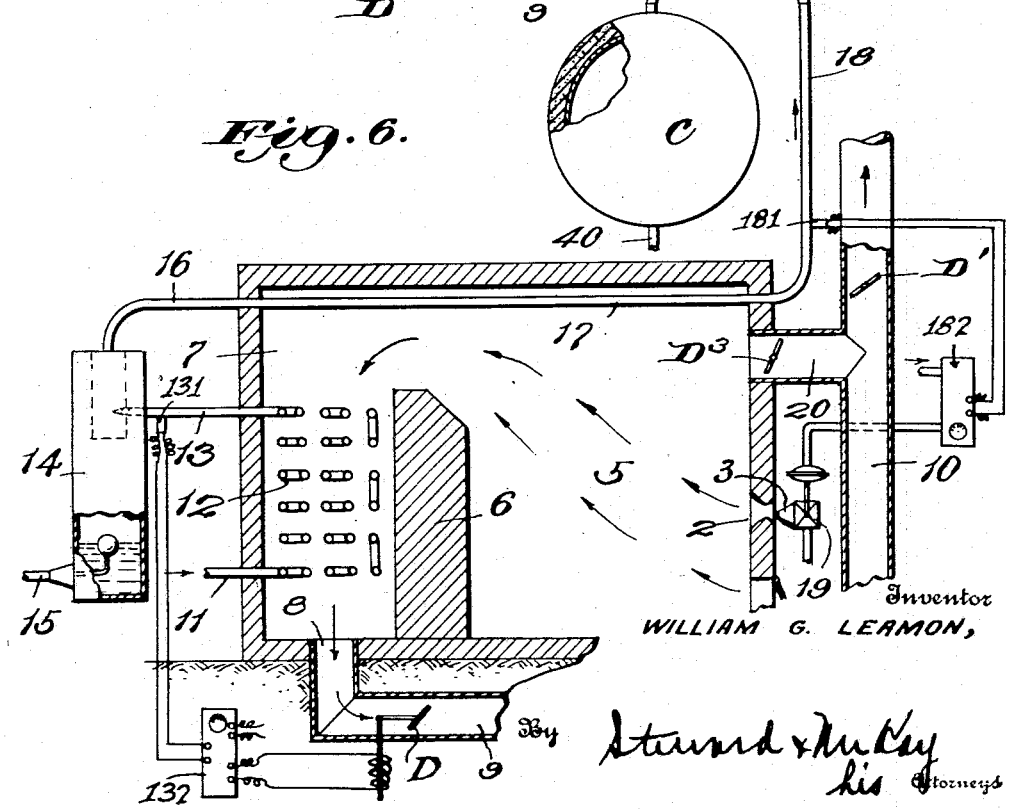

The apparatus described is particularly well adapted for carrying out a recently developed process wherein relatively heavy mineral oils of the petroleum type are treated to produce therefrom lower-boiling products, such as motor fuel and the like. In carrying out this process, mineral oil to be converted or cracked is first heated to a temperature below that normally effective for cracking, but sufficiently high to obtain a mixture of oil vapors and unvaporized heavy liquid oil, this mixture being conducted to a separator which removes the unvaporized oil from the vapor, the separated vapors being conducted through suitable heating or superheating elements where they are brought to a temperature that is high enough to effect cracking, but so rapidly as to avoid extensive cracking at this stage or deposition of carbon, the vapors then traveling through a cracking or converting chamber where effective vapor-phase cracking takes place, the resultant cracked vapors being then appropriately treated to recover therefrom a lower-boiling condensate, such as a motor fuel condensate. The liquid removed by the separator is drained off through a suitably arranged valved discharge outlet. In Fig. 6 is diagrammatically shown an arrangement of apparatus for carrying out the above described process.

Referring to Fig. 6, a topped crude petroleum, for example, is pumped under pressure through pipe 11 to coil 12, the oil being previously heated, if desired by passage through a heat exchanger or the like. The oil is heated in the vaporizer coil 12 to a temperature most desirably ranging from about 650° to 800° F., the exact temperature most desirable to employ being dependent somewhat upon the particular oil employed as starting material. A temperature within this range, while insufficiently high to effect extensive cracking, is nevertheless high enough to vaporize practically all that lighter portion of the oil which it is desired to permit to enter the cracking or converting zone. The mixture of vapors and particles of unvaporized liquid oil associated therewith leaves the initial heating coil 12 and enters the separator 14 by pipe 13, the pressure and temperature in separator 14 being not much lower than the pressure and temperature in coil 12. In this separator the unvaporized constituents of the oil drop out in liquid form and collect in the lower part thereof, from which they are drawn from time to time or continuously through pipe 15 controlled by a suitable liquid level regulating valve. From the separator the oil vapors pass through pipe 16 to the secondary heating or superheating coil 17 through which the oil vapors pass at high velocity and are rapidly brought to a temperature varying between 1000°–1100° F., averaging around 1050° F. in a typical instance, but the vapors do not remain therein long enough to permit substantial cracking or carbonization to occur. From superheater coil 17 the superheated vapors pass through pipe 18 to the vapor-phase cracking or reaction unit C, where the vapors are maintained at a sufficiently high temperature and for a sufficiently long time to enable effective cracking or conversion to take place. By thoroughly insulating cracking unit or zone C and operating so that the pressure drop between the superheater coil outlet and the cracking zone is slight, say 5 or 6 pounds, the cracking zone may be maintained at effective operating temperatures entirely by the superheat of the oil vapors entering the same and without employment of external heating. This is, of course, especially advantageous for obvious reasons. The hot cracked vapors leave the cracking chamber C through pipe 40 and are subjected to any usual or suitable treatment to recover a relatively low-boiling condensate therefrom. If desired, the process can be carried out so that extensive cracking takes place in either or both of coils 12 and 17.

Figs. 8 and 9 illustrate modifications of the invention which are generally similar to the form illustrated in Fig. 1, but in Figs. 8 and 9 the direction of flow of the fluid to be heated is the reverse of that shown in Fig. 1.

Referring to Fig. 8, the oil to be heated enters the vaporizing coil 12$^a$ through pipe 11$^a$, the vaporizing coil being radiantly heated, the liquid-vapor mixture from vaporizing coil 12$^a$ entering the separator 14 through pipe 13$^a$. The separated liquid is discharged through outlet pipe 15 controlled by a suitable liquid regulated valve, and the separated vapors from separator 14 pass through pipe 16$^a$ to the secondary or superheating coil 17$^a$ which is heated mainly by convection, the superheated vapor leaving through pipe 18$^a$. The exit temperatures of the materials from the two coils are controlled as in Fig. 3.

Fig. 9 is similar to Fig. 8, but in this case the separated liquid which collects in separator 14 is passed through pipe 15$^b$ to the convection heated coil 17$^b$, the heated materials leaving coil 17$^b$ through pipe 18$^b$. The vapors separated from the liquid oil in separator 14 leave through pipe 16$^b$. The outlet temperatures of the materials from the two coils are controlled as in Fig. 1.

It is to be understood that the invention is in no sense limited to the particular details of process and apparatus hereinabove given, but that the invention includes all modifications of process and apparatus which come within the scope of the appended claims.

What is claimed is:

1. A process of heat-treating mineral oils which comprises generating heat in a combustion chamber, applying said heat mainly by convection to one heat absorbing element and mainly by radiation to another heat absorbing element, passing mineral oil to be heated through each of said elements, controlling the exit temperature of the convection heated element by regulating the quantity of hot gases from said combustion chamber contacting therewith, and separately and independently controlling the exit temperature of the radiant heated element by regulating the temperature of the combustion chamber without materially affecting the exit temperature of the oil from the convection heated element.

2. A process of converting mineral oil into lower-boiling products which comprises generating heat by combustion in a chamber, heating a heating element mainly by radiant heat absorbed from such combustion chamber, heating another heating element mainly by contacting therewith hot gases from such combustion chamber, initially heating said mineral oil by passage through one of said heating elements, heating a product from the initial heating element to cracking temperature by passage through the other heating element, controlling the exit temperature of the radiant heated element by regulating the temperature of the combustion chamber, and separately and independently controlling the outlet temperature of the convection heated element by regulating the quantity of hot gases from the combustion chamber contacting therewith without materially affecting the exit temperature of the product from the radiant heated element.

3. A process of converting mineral oil into lower-boiling products which comprises generating heat by combustion in a chamber, heating a heating element mainly by radiant heat absorbed from such combustion chamber, heating another heating element mainly by contacting therewith hot gases from such combustion chamber, vaporizing a substantial portion of said mineral oil by passage through one of said heating elements while leaving a high-boiling portion substantially in unvaporized condition but commingled with the vapors, separating out the unvaporized portion, further heating said vapors to a temperature in excess of that required for effective cracking but so rapidly as to avoid extensive cracking at this stage by passage through the other of said heating elements, then maintaining said vapors in a cracking zone kept at effective cracking temperature by substantially only the superheat of said vapors for a period of time long enough to effect extensive cracking, recovering a relatively low-boiling condensate from the cracked vapors, and independently controlling the exit temperature of the material from each of said heating elements.

4. The process of converting mineral oil into lower-boiling products which comprises generating heat by combustion in a chamber, heating a heating element mainly by radiant heat absorbed from such combustion chamber, heating another heating element mainly by contacting therewith hot gases from such combustion chamber, heating said mineral oil and vaporizing a substantial portion thereof below effective cracking temperature by passage through the convection heated element while leaving a high boiling portion including contained tarry matter substantially in unvaporized condition but commingled with vapors, separating out the unvaporized portion, further heating said vapors to a temperature in excess of that required for effective cracking but so rapidly as to avoid extensive cracking at this stage by passage through the radiant heated element, then maintaining said vapors in a cracking zone kept at effective cracking temperature by the superheat of said vapors for a period of time long enough to effect extensive cracking, recovering a relatively low-boiling condensate from the cracked vapors, controlling the exit temperature of the convection heated element by regulating the quantity of hot gases contacting therewith, and controlling the exit temperature of the radiant heated element by regulating the temperature of the combustion chamber.

5. A process of heating oil which comprises initially heating an oil by passage through a pipe coil of a heating furnace, said coil being heated substantially only convectively by contact with hot gases from the combustion chamber of the furnace, secondarily heating the oil to a desired maximum exiting temperature by passage through a secondary heating coil of said furnace, said secondary heating coil being heated mainly by radiation from said combustion chamber, maintaining said exiting temperature by regulating the temperature of the combustion chamber, and separately controlling the temperature to which said oil is initially heated by regulating the quantity of hot gases from said combustion chamber contacting with the first mentioned heating coil without materially affecting the exit temperature of the oil from the radiant heated coil.

6. A process of heating oil which comprises generating heat by combustion in a chamber, heating a heating element mainly by radiant heat absorbed from such combustion chamber, heating a separate heating element mainly by contacting therewith hot gases from such combustion chamber, passing oil to be heated through each of said heating elements, controlling the exit temperature of the oil from the radiant heated element by regulating the temperature of the combustion chamber, separately controlling the exit temperature of the other heating element by regulating the quantity of heating gases contacting therewith, and returning to the combustion chamber part of the hot gases therefrom.

7. A process of heating oil which comprises generating heat by combustion in a chamber, heating a heating element mainly by radiant heat absorbed from such combustion chamber, heating a separate heating element mainly by contacting therewith hot gases from such combustion chamber, passing oil to be heated, through each of said heating elements, controlling the exit temperature of the oil from the radiant heated element by regulating the temperature of the combustion chamber, separately controlling the exit temperature of oil from the other heating element by regulating the quantity of heating gases contacting therewith, preheating air by heat exchange with hot waste gases from said combustion chamber, and supplying such preheated air to the combustion chamber.

8. The process of heat treating mineral oil which comprises heating mineral oil to a desired vaporizing temperature by passage through vaporizing coils of a pipe still which are heated mainly convectively by contact with hot gases from the combustion chamber of the still furnace, passing the heated oil, together with evolved vapors, into a liquid-vapor separator, superheating the separated vapors to a desired maximum exiting temperature by passage through superheating coils of said pipe still which are heated mainly by radiation from said combustion chamber, maintaining said exiting temperature by regulating the temperature of said combustion chamber, and separately controlling the vaporizing temperature by regulating the quantity of hot gases from said combustion chamber contacting with said vaporizer coils without materially affecting the exit temperature of the vapors from the radiant heated coils.

9. The process of heat treating mineral oil which comprises heating mineral oil by passage through a plurality of separate heating elements subjected to a heated medium which is maintained at a predetermined temperature dependent upon the maximum temperature to which it is desired to heat said oil, the element for the initial heating being heated to a temperature sufficient to vaporize oil passing therethrough, substantially only convectively by contact with said heated medium, the vapors from said initial heating element being superheated by passage through another of said heating elements heated mainly by radiation from said heated medium, and separately and independently controlling the temperature to which said oil is initially heated by regulating the quantity of the heating medium contacting with the initial heating element without materially affecting the exit temperature of the vapors from the radiant heated element.

10. The process of heat treating mineral oil which comprises heating mineral oil to a desired vaporizing temperature by passage through vaporizing coils which are heated substantially only convectively by contact with hot gases which are maintained at a predetermined temperature dependent upon the maximum temperature to which it is desired to heat said oil, passing the resultant liquid oil-oil vapor mixture into a liquid-vapor separator, superheating the separated vapors by passage through superheating coils heated mainly by radiation from said hot gases, and separately and independently controlling the vaporizing temperature by regulating the quantity of hot gases contacting with said vaporizing coils without materially affecting the exit temperature of the vapors from the radiant heated coil.

11. The process of heat treating mineral oil which comprises heating mineral oil to a desired vaporizing temperature by passage through vaporizing coils of a pipe still which are heated substantially only convectively by contact with hot gases from the combustion chamber of the still furnace, passing the heated oil into a liquid-vapor separator, superheating the separated vapors to a desired maximum exiting temperature by passage through superheating coils of said pipe still which are heated mainly by radiation from said combustion chamber, maintaining said exiting temperature by regulating the temperature of the combustion chamber, separately and independently controlling the vaporizing temperature by regulating the quantity of hot gases from said combustion chamber contacting with said vaporizer coils, and controlling the quantity of hot gases from said combustion chamber by regulating the quantity of gas or gases admitted thereto.

12. The process of heat treating mineral oil which comprises heating mineral oil to a desired vaporizing temperature by passage through vaporizing coils of a pipe still which are heated substantially only convectively by contact with hot gases from the combustion chamber of the still furnace, passing the heated oil into a liquid-vapor separator, super-heating the separated vapors to a desired maximum exiting temperature by passage through superheating coils of said pipe still which are heated mainly by radiation from said combustion chamber, maintaining said exiting temperature by regulating the supply of fuel to the furnace, separately and independently controlling the vaporizing temperature by regulating the quantity of hot gases from said combustion chamber contacting with said vaporizer, and returning to the combustion chamber part of the hot gases which have passed over the heating coils.

13. The process of heat-treating mineral oil which comprises heating mineral oil to a desired vaporizing temperature by passage through vaporizing coils of a pipe still which are heated substantially only convectively by contact with hot gases from the combustion chamber of the still furnace, passing the heated oil into a liquid-vapor separator, superheating the separated vapors to a desired maximum exiting temperature by passage through superheating coils of said pipe still which are heated mainly by radiation from said combustion chamber, maintaining said exiting temperature by regulating the supply of fuel to the furnace, separately and independently controlling the vaporizing temperature by regulating the quantity of hot gases from said combustion chamber contacting with said vaporizer, preheating air by heat exchange with hot gases which have passed over the heating coils, and supplying such preheated air to the combustion chamber.

14. The process of heat-treating mineral oil which comprises heating mineral oil to a desired vaporizing temperature by passage through vaporizing coils of a pipe still which are heated substantially only convectively by contact with hot gases from the combustion chamber of the still furnace, passing the heated oil into a liquid-vapor separator, superheating the separated vapors to a desired maximum temperature by passage through superheating coils of said pipe still which are heated mainly by radiation from said combustion chamber, maintaining said maximum temperature by regulating the supply of fuel to the furnace, separately and independently controlling the vaporizing temperature by regulating the quantity of hot gases from said combustion chamber contacting with said vaporizer, preheating air by passage through a heat exchanger heated by hot gases which have passed over the heating coils, supplying such preheated air to the combustion chamber, and returning to the combustion chamber part of the hot gases which have passed over the heating coils and which have not passed through the heat exchanger.

15. An oil heater comprising a combustion chamber and a plurality of heating elements for the oil to be heated, one of said heating elements being heated mainly by radiant heat absorbed from said combustion chamber and the other heating element being heated mainly by contact with heating gases from said combustion chamber, means for controlling the exit temperature of the oil heated in one of said elements by regulating the temperature of said combustion chamber, and means for separately and independently controlling the exit temperature of the oil heated in the other heating element by regulating the quantity of heating gases contacting with said element, the quantity of heating gases contacting with the other heating element being controlled by the exit temperature of said element and the exit temperature of the first element controlling the supply of fuel to said combustion chamber.

16. An oil heater comprising a combustion chamber and a plurality of separate heating elements, one of said heating elements being heated mainly by radiant heat absorbed from said combustion chamber and the other heating element being heated mainly by contact with heating gases from said combustion chamber, means for passing oil to be heated through each of said heating elements, means for controlling the exit temperature of the oil heated in the other heating element by regulating the quantity of heating gases contacting therewith, and means for automatically controlling the supply of fuel to the combustion chamber by the exit temperature of the oil passing through the radiant heated element.

17. An oil still having a heating chamber and a firebox communicating therewith, a plurality of heating elements, means for heating one of said elements mainly by contact with hot gases from said firebox, means for heating the other element mainly by radiant heat absorbed from said firebox, means for passing oil through each of said elements, and means for separately and independently controlling the exit temperature of the oil from each of said elements, the quantity of heating gases contacting with the first heating element being controlled by the exit temperature of said element and the exit temperature of the other heating element controlling the supply of fuel to said firebox.

18. An oil still having a heating chamber and a firebox communicating therewith, a plurality of heating elements, means for heating one of said elements mainly by contact with hot gases from said firebox, means for heating the other element mainly by radiant heat absorbed from said firebox, means for passing oil through each of said elements, means for separately and independently controlling the exit temperature of the oil from each of said elements the quantity of heating gases contacting with the first heating element being controlled by the exit temperature of said element and the exit temperature of the other heating element controlling the supply of fuel to said firebox, and means for returning part of the hot gases exiting from the heating chamber to said chamber.

19. Distilling apparatus comprising an oil still having a heating chamber, a vaporizing coil and a superheating coil adapted to be heated therein, a firebox, means for passing hot gases from said firebox in contact with said vaporizing coil to heat the same convectively, means for shielding said vaporizing coil from heat radiated from said firebox, a liquid-vapor separator receiving a liquid-vapor mixture from said vaporizing coil and supplying separated vapor to said superheating coil, said superheating coil being exposed to heat radiated from said firebox, means for controlling the exit temperature of the oil heated in the vaporizing coil by regulating the quantity of said hot gases contacting with said vaporizing coil, and means for separately and independently controlling the exit temperature of the vapor heated in the superheating coil by regulating the temperature of said firebox.

20. Distilling apparatus comprising an oil still having a heating chamber, a vaporizing coil and a superheating coil adapted to be heated therein, a firebox, means for passing hot gases from said firebox in contact with said vaporizing coil to heat the same convectively, said superheating coil being exposed to heat radiated from said firebox whereby it is heated mainly by radiation, means for shielding said vaporizing coil from heat radiated from said firebox, a liquid-vapor separator receiving a liquid-vapor mixture from said vaporizing coil and delivering separated vapors to said superheating coil, means for controlling the exit temperature of the oil heated in the vaporizing coil by regulating the quantity of said hot gases contacting with said vaporizing coil, and means for separately and independently controlling the exit temperature of the vapor heated in the superheating coil by regulating the temperature of said firebox.

21. Distilling apparatus comprising an oil still including a vaporizing coil and a superheating coil for heating oil passed therethrough, a firebox for supplying heat to said coils, the superheating coil being directly exposed to, and the vaporizing coil being shielded from, heat radiated from said firebox, means for passing hot gases from said firebox in contact with said vaporizing coil, a liquid-vapor separator receiving a liquid-vapor mixture from said vaporizing coil and delivering separated vapors to said superheating coil, means for controlling the exit temperature of the oil heated in the vaporizing coil by regulating the quantity of said hot gases contacting with said vaporizing coil, and means for separately and independently controlling the exit temperature of the vapor heated in the superheating coil by regulating the temperature of said firebox, and means for returning hot gases which have passed over said vaporizing coil to the firebox for recirculation.

22. Apparatus for converting mineral oil into lower boiling products which comprises, in combination an oil still having a combustion chamber, a coil heated mainly by contact with hot gases from said combustion chamber for heating said oil to obtain oil vapors mixed with liquid oil, mechanical separating means connected to such heating coil and into which such vapor-liquid mixture is discharged, a superheater coil arranged to receive vapor from said separating means and to heat the same to cracking temperature, said superheater coil being heated mainly by radiant heat absorbed from said combustion chamber, a heat-insulated cracking chamber connected to said superheater coil for receipt of vapors therefrom, means for regulating the temperature of the hot gases from said combustion chamber, and means for regulating the quantity of hot gases contacting with the vaporizing coil.

23. A process of heat treating mineral oil which comprises generating heat by combustion in a chamber, heating a heating element mainly by radiant heat absorbed from such combustion chamber, heating another heating element mainly by contacting therewith hot gases from such combustion chamber, initially heating said mineral oil by passage through one of said heating elements, further heating a product from the initial heating element by passage through the other heating element, controlling the exit temperature of the radiant heated element by regulating the temperature of the combustion chamber, and separately and independently controlling the outlet temperature of the convection heated element by regulating the quantity of hot gases from the combustion chamber contacting therewith without materially affecting the exit temperature of the product from the radiant heated element.

24. The process of heat treating mineral oil which comprises heating mineral oil to a desired vaporizing temperature by passage through vaporizing coils of a pipe still which are heated mainly by radiation from the combustion chamber of the still furnace, passing the heated oil, together with evolved vapors, into a liquid-vapor separator, superheating the separated vapors to a desired maximum exiting temperature by passage through superheating coils of said pipe still which are heated mainly convectively by contact with hot gases from said combustion chamber, controlling said exiting temperature by regulating the quantity of the hot gases from said combustion chamber contacting with said superheater coils, and separately controlling the vaporizing temperature by regulating the temperature of said combustion chamber without materially affecting the exit temperature of the vapors from the convectively heated coils.

25. The process of heat treating mineral oil which comprises heating mineral oil to a desired vaporizing temperature by passage through vaporizing coils of a pipe still which are heated mainly by radiation from the combustion chamber of the still furnace, passing the heated oil, together with evolved vapors, into a liquid-vapor separator, further heating the separated liquid to a desired maximum exiting temperature by passage through secondary heating coils of said pipe still which are heated mainly convectively by contact with hot gases from said combustion chamber, controlling said exiting temperature by regulating the quantity of the hot gases from said combustion chamber contacting with said secondary heating coils, and separately controlling the vaporizing temperature by regulating the temperature of said combustion chamber without materially affecting the exit temperature of the convectively heated coils.

26. The process of heat treating mineral oil which comprises heating mineral oil to a desired vaporizing temperature by passage through heating coils of a pipe still which are heated mainly by radiation from the combustion chamber of the still furnace, further heating the unvaporized liquid to a desired maximum exiting temperature by passage through secondary heating coils of said pipe still which are heated mainly convectively by contact with hot gases from said combustion chamber, controlling said exiting temperature by regulating the quantity of the hot gases from said combustion chamber contacting with said secondary heating coils, and separately controlling the vaporizing temperature by regulating the temperature of said combustion chamber without materially affecting the exit temperature of the convectively heated coils.

27. An oil still comprising a combustion chamber, a plurality of heating elements, means for heating one of said elements mainly by contact with hot gases from said combustion chamber, means for heating the other element mainly by radiant heat absorbed from said combustion chamber, means for passing oil through each of said elements, a liquid-vapor separator receiving a liquid-vapor mixture from one of said elements and supplying separated liquid to said other element, means for controlling the exit temperature of the oil heated in one of said elements by regulating the temperature of said combustion chamber, and means for separately and independently controlling the exit temperature of the oil heated in the other heating element by regulating the quantity of heating gases contacting with said element.

WILLIAM G. LEAMON.